Patented Sept. 30, 1947

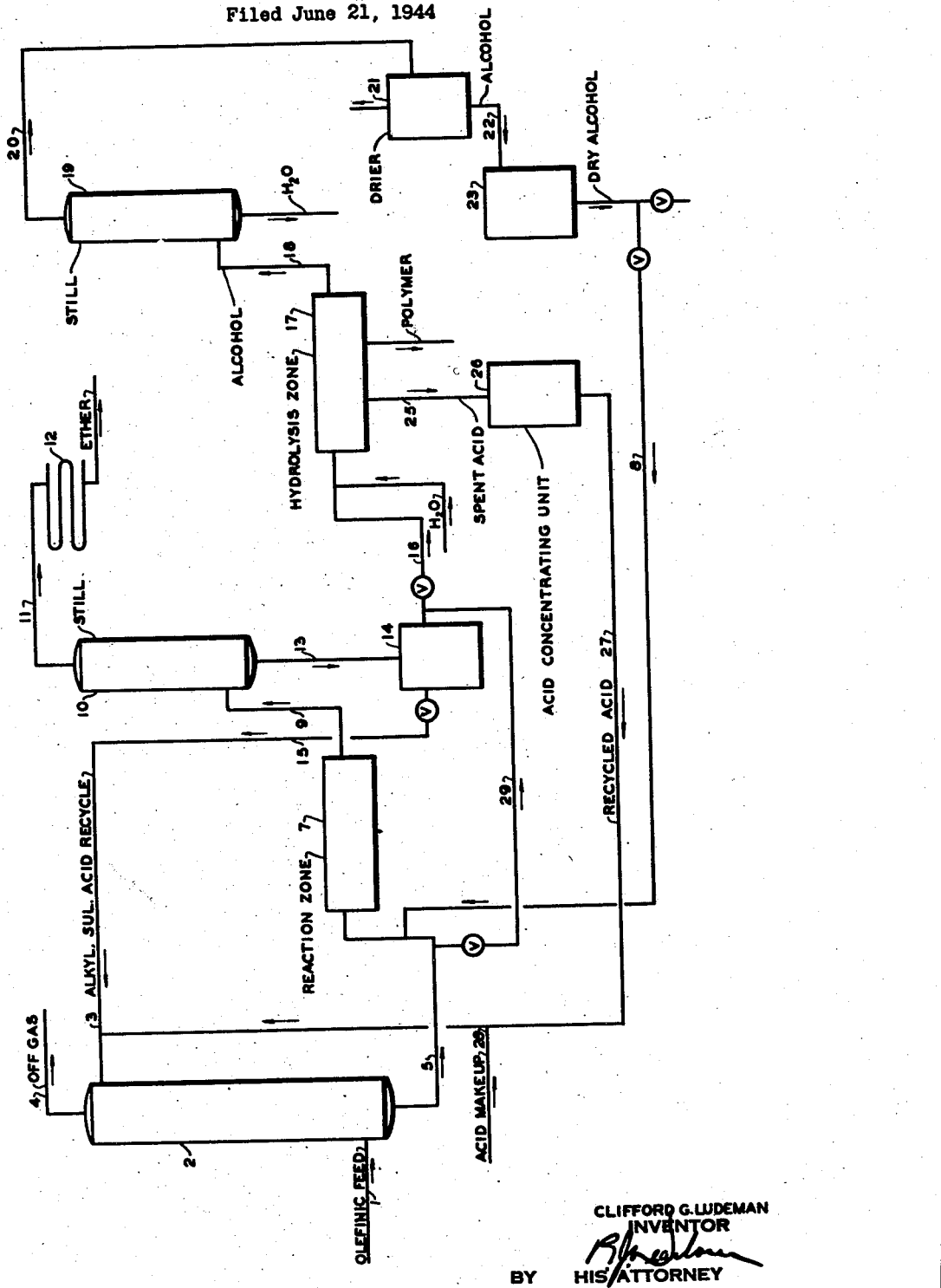

2,428,119

UNITED STATES PATENT OFFICE 2,428,119

PREPARATION OF OXYGENATED COMPOUNDS FROM OLEFINS

Clifford G. Ludeman, Scarsdale, N. Y., assignor to Texaco Development Corporation, New York, N. Y., a corporation of Delaware Application June 21, 1944, Serial No. 541,441

3 Claims. (Cl. 260—614)

This invention relates to preparation of oxygenated compounds such as ethers and alcohols from normally gaseous olefins.

The invention contemplates a continuous cyclic process for separating normally gaseous olefins from hydrocarbon mixtures containing them and converting the separated olefins or mixtures of olefins into the desired oxygenated compounds with the aid of sulfuric acid.

In accordance with the invention, olefinic feed gas is subjected to contact with concentrated sulfuric acid to produce an acid olefin mixture containing dialkyl sulfate and alkyl sulfuric acid. The dialkyl sulfate components of the mixture are reacted with anhydrous alcohol, advantageously of the same number of carbon atoms as the dialkyl sulfate, to form an ether which is removed from the residual alkyl sulfuric acid. A portion of the latter is recycled for contact with the olefinic feed mixture while the remainder is converted into alcohol. The spent acid from the alcohol manufacture is recovered, reconcentrated and recycled to the absorption stage.

It is contemplated that the process may be operated so as to produce ethers substantially exclusive of any alcohol in excess of that required for converting the sulfates to ether. In other words, an operation is contemplated in which there is substantially no net production of alcohol. Such a process is self-contained from the standpoint of converting olefins to ethers such as ethyl ether, propyl ether and the butyl ethers.

Provision may, however, be made for modifying the operation so as to produce some alcohol if desired.

In order to describe the invention in more detail, reference will now be made to the accompanying drawing.

As indicated in the drawing, an olefinic feed gas is drawn from a source not shown through a pipe 1. This olefinic feed gas may be a $C_2$, a $C_3$ or a $C_4$ fraction of hydrocarbon gases such as derived from the catalytic cracking of gas oil. The feed may comprise a mixture of olefins having from 2 to 4 carbon atoms per molecule.

The feed gas is conducted through the pipe 1 to the lower portion of an absorption tower 2 wherein it is subjected to countercurrent contact with a stream of concentrated sulfuric acid introduced to the upper portion of the tower through a pipe 3. The proportion of olefins to sulfuric acid flowing through the absorption tower is maintained within the ratio of about 1 to 2 mols of olefin to 1 mol of $SO_4$ content. The sulfuric acid used in the absorption stage has an organic free acidity of about 90 to 100%.

The acid feed to the absorption tower will comprise a substantial amount of alkyl sulfuric acid recycled from a subsequent stage as will be explained.

The temperature of absorption may be varied depending upon the composition of the olefin feed gas. For example, when absorbing ethylene from a $C_2$ fraction, the absorption temperature may range from about 50 to 120° F., employing an acid concentration in the range of 97 to 100%. In the case of propylene, the absorption temperature may range from 20 to 60° F. with an acid concentration of 95 to 98%. For butylenes, the absorption temperature may range from about 0 to 60° F., employing an acid of 90 to 97% concentration, basis organic free acid.

The olefin is extracted from the gaseous mixture and the residual gases comprising saturated gaseous hydrocarbons are continuously discharged through a pipe 4.

The rich acid mixture is continuously discharged from the bottom of the tower through a pipe 5 and is composed of dialkyl sulfate and alkyl sulfuric acid, the dialkyl sulfate content ranging from 30 to 95 weight per cent of the mixture, and preferably as high as possible.

The absorption of olefins in the acid is carried out under conditions to obtain maximum olefin absorption in the form of dialkyl sulfate. Advantageously, the absorption is carried out in a bubble-cap tower operated with a temperature gradient throughout the tower, the lower temperature being at the olefin inlet. The difference in temperature between the bottom and top of the tower may be about 20 to 70° F. It is advantageous to effect the absorption under elevated pressures to favor the formation of dialkyl sulfate.

The rich acid mixture is conducted through pipe 5 to a reaction zone 7 wherein it is subjected to contact with anhydrous alcohol obtained from a subsequent stage, as will be explained, and introduced from a pipe 8. The alcohol is added in an amount substantially the molar equivalent of the dialkyl sulfate content of the rich acid mixture.

When reacting dialkyl sulfate with ethyl alcohol the reaction temperature may be in the range of 200 to 300° F. For reacting propyl sulfates with propyl alcohol the temperature may range from 175 to 250° F., while in the case of reacting butyl sulfates with butyl alcohol the temperature may range from 150 to 225° F.

The reaction is carried out under conditions such that the alkyl sulfate is converted substantially entirely to the corresponding ether.

A stream of reaction mixture is conducted from a reaction zone 7 through a pipe 9 to a still 10 wherein the ether is distilled from the mixture, the temperatures ranging up to about 300° F. and preferably not in excess of about 200° F. Absolute pressures ranging from atmospheric to about 10 inches of mercury may be employed, low absolute pressures being desirable with the higher molecular weight ethers.

The ether is discharged through a pipe 11 and condenser 12.

Conditions of flow through the reaction zone 7 and the still 10 are such that the reactants and products remain exposed to elevated temperature for a brief period of several minutes or less, and preferably not in excess of about ten minutes.

The residual alkyl sulfuric acid is continuously drawn off from the still through a pipe 13 to a receiver 14. Advantageously, the withdrawn acid is cooled as soon as removed from the still.

A portion of the alkyl sulfuric acid is recycled through a pipe 15 to the previously mentioned pipe 3 for return to the absorption tower 2. The remaining portion is conducted through a pipe 16 to a hydrolysis zone 17 wherein it is treated with water under conditions so as to convert the alkyl sulfuric acid to alcohol. The hydrolysis zone is indicated in diagrammatic manner and will include the usual means for effecting mixing and contact with water, settling and distillation of an alcohol-water mixture from the hydrolyzed alkyl sulfuric acid. The hydrolysis may be carried out by mixing the acid mixture with about 1 to 3 volumes of water and heating with refluxing for a period of time ranging from several minutes to several hours.

Provision may be made for separating the small amount of polymer material that may be formed.

The resulting alcohol-water mixture is removed from the hydrolysis zone 17 through a pipe 18 to a still 19 wherein alcohol is distilled from the mixture as an azeotrope or in the form of essentially dry alcohol in some cases.

The alcohol distillate is conducted through a pipe 20 to a drying stage 21 wherein the alcohol is dried or rendered anhydrous by any suitable method such as by dehydration agents, azeotropic distillation or ternary distillation or combinations thereof. The dry alcohol is then conducted through a pipe 22 to a receiver 23. This receiver provides the source for the alcohol conducted through the pipe 8 to the reaction zone 7.

Referring again to the hydrolysis zone 17, the spent acid is drawn off through a pipe 25 to an acid concentrating unit 26 which may be of the conventional type adapted for restoring the acid to an organic-free acidity in the range 90 to 100%.

The reconcentrated acid is conducted through pipe 27 which communicates with the previously mentioned pipe 3 by which means it is returned to the absorption tower 2.

Provision may be made for adding any make-up acid from a source not shown through a pipe 28.

Also, as indicated, provision may be made for passing some of the rich acid mixture leaving the absorption tower 2 through a pipe 29 leading to the hydrolysis zone 17.

When it is desired to operate without a net production of alcohol, sufficient of the alkyl sulfuric acid is recycled through the pipe 15 to the absorption tower 2 so that the remainder, passing to the alcohol production stage, will be just sufficient to produce enough alcohol to react with the dialkyl sulfate or sulfates passing to the reaction zone 7. On the other hand, if a net production of alcohol is desired, then the amount of alkyl sulfuric acid recycled through the pipe 15 to the absorption tower 2 is decreased so that there is a corresponding decrease in the production of dialkyl sulfate.

Obviously many modifications and variations of the invention as above set forth may be made without departing from the spirit and scope thereof, and therefore only such limitations should be imposed as are indicated in the appended claims.

I claim:

1. A continuous process for the manufacture of ethers from normally gaseous olefins which comprises passing olefinic feed gas in contact with concentrated sulfuric acid having an organic free acidity of at least about 90% in an absorption zone thereby forming an acid mixture containing dialkyl sulfate and alkyl sulfuric acid, said dialkyl sulfate amounting to at least about 30 weight per cent of the mixture, passing said acid mixture to a reaction zone, subjecting it to contact therein with an amount of anhydrous alcohol which is substantially the molar equivalent of the dialkyl sulfate content of said mixture and under conditions such that dialkyl sulfate and said alcohol react to form an aliphatic ether in substantial amount, separating ether from the alkyl sulfuric acid, returning at least a substantial portion of the residual alkyl sulfuric acid to the absorption zone, passing another portion of the residual acid to a hydrolyzing zone, treating it in the hydrolyzing zone with water thereby to convert alkyl sulfuric acid into alcohol and produce spent acid, removing alcohol from the spent acid, drying the alcohol and passing the dried alcohol to said reaction zone to provide the anhydrous alcohol required for reaction with dialkyl sulfate.

2. A continuous process for the manufacture of ethers from normally gaseous olefins which comprises passing olefinic feed gas in contact with concentrated sulfuric acid having an organic free acidity of at least about 90% in an absorption zone thereby forming an acid mixture containing dialkyl sulfate and alkyl sulfuric acid, said dialkyl sulfate amounting to at least about 30 weight per cent of the mixture, passing said acid mixture to a reaction zone, subjecting it to contact therein with an amount of anhydrous alcohol which is substantially the molar equivalent of the dialkyl sulfate content of said mixture and under conditions such that dialkyl sulfate and said alcohol react to form an aliphatic ether in substantial amount, separating ether from the alkyl sulfuric acid, returning at least a substantial portion of the residual alkyl sulfuric acid to the absorption zone, passing another portion of the residual acid to a hydrolyzing zone, treating it in the hydrolyzing zone with water thereby to convert alkyl sulfuric acid into alcohol and produce spent acid, removing alcohol from the spent acid, reconcentrating the spent acid, recycling the reconcentrated acid to the absorption zone, drying the alcohol and passing the dried alcohol to said reaction zone to provide the anhydrous alcohol required for reaction with dialkyl sulfate.

3. A continuous process for the manufacture of ethers from normally gaseous olefins which comprises passing olefinic feed gas in contact with concentrated sulfuric acid having an organic free acidity of at least about 90% in an absorption zone thereby forming an acid mixture containing dialkyl sulfate and alkyl sulfuric acid, said dialkyl sulfate amounting to at least about 30 weight per cent of the mixture, passing said acid mixture to a reaction zone, subjecting it to contact therein with an amount of anhydrous alcohol which is substantially the molar equivalent of the dialkyl sulfate content of said mixture and under conditions such that dialkyl sulfate and said alcohol react to form an aliphatic ether in substantial amount, separating ether from the alkyl sulfuric acid, returning at least a substantial portion of the residual alkyl sulfuric acid to the absorption zone, passing another portion of the residual acid to a hydrolyzing zone, treating it in the hydrolyzing zone with water thereby to convert alkyl sulfuric acid into alcohol and produce spent acid, removing alcohol from the spent acid, and adjusting the proportion of residual alkyl sulfuric acid mixture returned to the absorption zone such that there is substantially no net production of alcohol over that required for reaction with said alkyl sulfate.

CLIFFORD G. LUDEMAN.

REFERENCES CITED

The following references are of record in the file of this patent:

UNITED STATES PATENTS

| Number | Name | Date |
| --- | --- | --- |
| 1,961,987 | Schumann | June 5, 1934 |
| 2,105,508 | Rosen | Jan. 18, 1938 |
| 2,131,030 | Archibald | Sept. 27, 1938 |
| 2,216,931 | Archibald | Oct. 8, 1940 |